(12) United States Patent
Farmer et al.

(10) Patent No.: US 11,604,131 B2
(45) Date of Patent: Mar. 14, 2023

(54) PARTICULATE MATTER SENSOR AND METHOD THEREFOR

(71) Applicant: TSI Incorporated, Shoreview, MN (US)

(72) Inventors: Kenneth Farmer, Lake Elmo, MN (US); Thomas Edward Kennedy, West Lakeland, MN (US)

(73) Assignee: TSI Incorporated, Shoreview, MN (US)

( * ) Notice: Subject to any disclaimer, the term of this patent is extended or adjusted under 35 U.S.C. 154(b) by 580 days.

(21) Appl. No.: 16/605,899

(22) PCT Filed: Apr. 16, 2018

(86) PCT No.: PCT/US2018/027815
§ 371 (c)(1),
(2) Date: Oct. 17, 2019

(87) PCT Pub. No.: WO2018/194986
PCT Pub. Date: Oct. 25, 2018

(65) Prior Publication Data
US 2020/0080922 A1   Mar. 12, 2020

Related U.S. Application Data

(60) Provisional application No. 62/486,234, filed on Apr. 17, 2017.

(51) Int. Cl.
*G01N 15/06* (2006.01)
*G01N 15/02* (2006.01)
(Continued)

(52) U.S. Cl.
CPC ..... *G01N 15/0618* (2013.01); *G01N 15/0205* (2013.01); *G01N 15/1459* (2013.01); *G01N 2015/03* (2013.01); *G01N 2015/0693* (2013.01)

(58) Field of Classification Search
CPC ......... G01N 15/0618; G01N 15/00205; G01N 15/1459; G01N 2015/03;
(Continued)

(56) References Cited

U.S. PATENT DOCUMENTS 6,205,842 B1  3/2001  Patashnlck et al.
7,111,496 B1  9/2006  Lilienfeld et al.
(Continued)

FOREIGN PATENT DOCUMENTS

CN   101398367   4/2009
CN   104122180   10/2014
(Continued)

OTHER PUBLICATIONS

"European Application Serial No. 18787066.2, Response to Communication pursuant to Rules 161(2) and 162 EPC filed May 28, 2020", 9 pages.
(Continued)

*Primary Examiner* — David Z Huang
(74) *Attorney, Agent, or Firm* — Schwegman Lundberg & Woessner, P.A.

(57) ABSTRACT

Various embodiments include methods and systems to measure and calibrate an optical particle spectrometer for reporting mass concentration. In one embodiment, an optical particle spectrometer is used to measure a concentration of particulate matter in a sampled particle-laden airstream. A particle diverter, in fluid communication with the spectrometer, diverts at least a portion of the particle-laden airstream at predetermined intervals. In one example, a mass filter receives the portion of the particle-laden airstream and filters a fraction of the particles within the airstream that are above a predetermined particle size. A mass sensor measures a mass of the fraction of the particles received from the mass filter or from the particle diverter and uses a calibration
(Continued)

communication loop to provide the measured mass to the spectrometer to apply a correction factor to report mass concentration from the optical particle spectrometer. Other methods and systems are disclosed.

20 Claims, 5 Drawing Sheets

(51) Int. Cl.
  *G01N 15/14* (2006.01)
  *G01N 15/00* (2006.01)
(58) Field of Classification Search
  CPC ........... G01N 2015/0693; G01N 15/06; G01N 15/1012; G01N 21/25
  See application file for complete search history.

(56) References Cited

U.S. PATENT DOCUMENTS

| | | |
|---|---|---|
| 7,174,767 B2 | 2/2007 | Booker |
| 7,600,441 B2 | 10/2009 | Zeng |
| 9,726,579 B2 | 8/2017 | Han et al. |
| 2009/0039249 A1 | 2/2009 | Wang et al. |
| 2012/0012744 A1 | 1/2012 | Wang et al. |
| 2013/0036793 A1 | 2/2013 | White et al. |
| 2016/0216193 A1 | 7/2016 | Han |

FOREIGN PATENT DOCUMENTS

| | | | |
|---|---|---|---|
| CN | 203941085 | 11/2014 | |
| CN | 104237087 | 12/2014 | |
| CN | 105572005 | 5/2016 | |
| CN | 110662952 | 1/2020 | |
| WO | WO-2014202771 A2 * | 12/2014 | ........... G01N 1/2202 |
| WO | WO-2018194986 A2 | 10/2018 | |
| WO | WO-2018194986 A3 | 10/2018 | |

OTHER PUBLICATIONS

"International Application Serial No. PCT/US2018/027815, International Preliminary Report on Patentability dated Aug. 20, 2019", 9 pgs.
"International Application Serial No. PCT/US2018/027815, International Search Report dated Nov. 27, 2018", 5 pgs.
"International Application Serial No. PCT/US2018/027815, Written Opinion dated Nov. 27, 2018", 7 pgs.
"International Application Serial No. PCT/US2018/027815, Written Opinion dated Jun. 25, 2019", 7 pgs.
Tanaka, Yutaka, et al., "Application of centrifugal filter to aerosol size distribution measurement", Aerosol Science and Technology, vol. 51, No. 11, [Online], Retrieved from the Internet: <https://doi.org/10.1080/02786826.2017.1339864>, (2017), pp. 1254-1261.
"Chinese Application Serial No. 201880032437.X, Office Action dated Dec. 31, 2021", with English translation, 22 pages.
"European Application Serial No. 18787066.2, Extended European Search Report filed Dec. 17, 2020", 9 pages.
"Chinese Application Serial No. 201880032437.X, Response filed May 16, 2022 to Office Action dated Dec. 31, 2021", w/English Claims, 16 pgs.

* cited by examiner

PARTICULATE MATTER SENSOR AND METHOD THEREFOR

CLAIM OF PRIORITY

This application is a U.S. national-phase application filed under 35 U.S.C. § 371 from International Application Serial No. PCT/US2018/027815, filed on Apr. 16, 2018 and published as WO 2018/194986 on Oct. 25, 2018, which claims the benefit of priority to U.S. Provisional Patent Application Ser. No. 62/486,234, tiled Apr. 17, 2017, and entitled, "PARTICULATE MATTER SENSOR AND METHOD THEREFOR," the disclosures of which are hereby incorporated by reference in their entireties.

TECHNICAL FIELD

The inventive subject matter disclosed herein relates to particulate matter sensors, and, more specifically, to optical particle spectrometers calibrated in substantially real time by mass concentration sensors.

BACKGROUND

Airborne particulate matter (PM) pollutants are small solid particles or liquid droplets suspended in the atmosphere. The particles or droplets may include, for example, diesel exhaust, tobacco smoke, volcanic ash, bacteria, mold spores, and pollen. PM pollutants have diameters ranging from many tens of micrometers (μm) down to a few nanometers. PM pollutants measuring, for example, 2.5 μm in diameter or less ($PM_{2.5}$), are particularly harmful to humans as they can penetrate deep into human respiratory systems, and may even get into the bloodstream. A determination of particulate matter relates the mass of particles per unit volume, indicated as a mass concentration value.

Therefore, the mass concentration provides an indication of the actual mass of particulate matter per unit volume in a given environment (e.g., within a tunnel on an interstate highway system or other transportation routes with heavy traffic (e.g., automobiles, diesel-powered trains, bus routes, etc.), the interior of an automobile or bus, the interior of a factory floor, or a number of other environments). Mass concentration values are typically reported in units of micrograms per cubic meter ($\mu g/m^3$). For example, a mass concentration of particulate matter in a large, congested or polluted city can be approximately 200 $\mu g/m^3$ or higher. Mass concentration values may also be related to a given particle diameter such as $PM_{10}$ (10 μm and smaller), $PM_{2.5}$ (2.5 μm and smaller), or $PM_1$ (1 μm and smaller). Public health agencies typically report mass concentration statistics with a 10% accuracy, or better.

Mass concentration values can be contrasted with a particle count (e.g., as reported by an optical particle counter (OPC) or optical particle spectrometer (OPS)) as the OPC may simply provide a total number of particles, or the total number of particles sorted by particle size ranges (as with an OPS). Consequently, an OPC or an OPS does not measure true mass, does not account for the density of particles measured, generally does not account for the reflectivity of the particles, and so on. However, often these devices are used to provide an estimate of true mass by making assumptions about the particle density and reflectivity, but the accuracy of such an estimate can be off by a factor of two or more. Nonetheless, OPC and OPS devices are generally more compact, less expensive, and easier to operate and maintain than many true mass concentration measurement devices. Moreover, recently developed miniature devices that measure mass concentration based on a resonant frequency change as particles are deposited and suffer from the fact that the miniature devices load with particles over time, eventually changing their response characteristics, and are thus not useful for continuous use over long periods of time. In contrast, OPS and OPC devices measure particles that pass through them, so they do not load with particles. Therefore, what is needed is a way to accurately and precisely correlate the total number concentration of particles reported by an OPC or OPS with true mass concentration values.

DETAILED DESCRIPTION

Figure 1A:
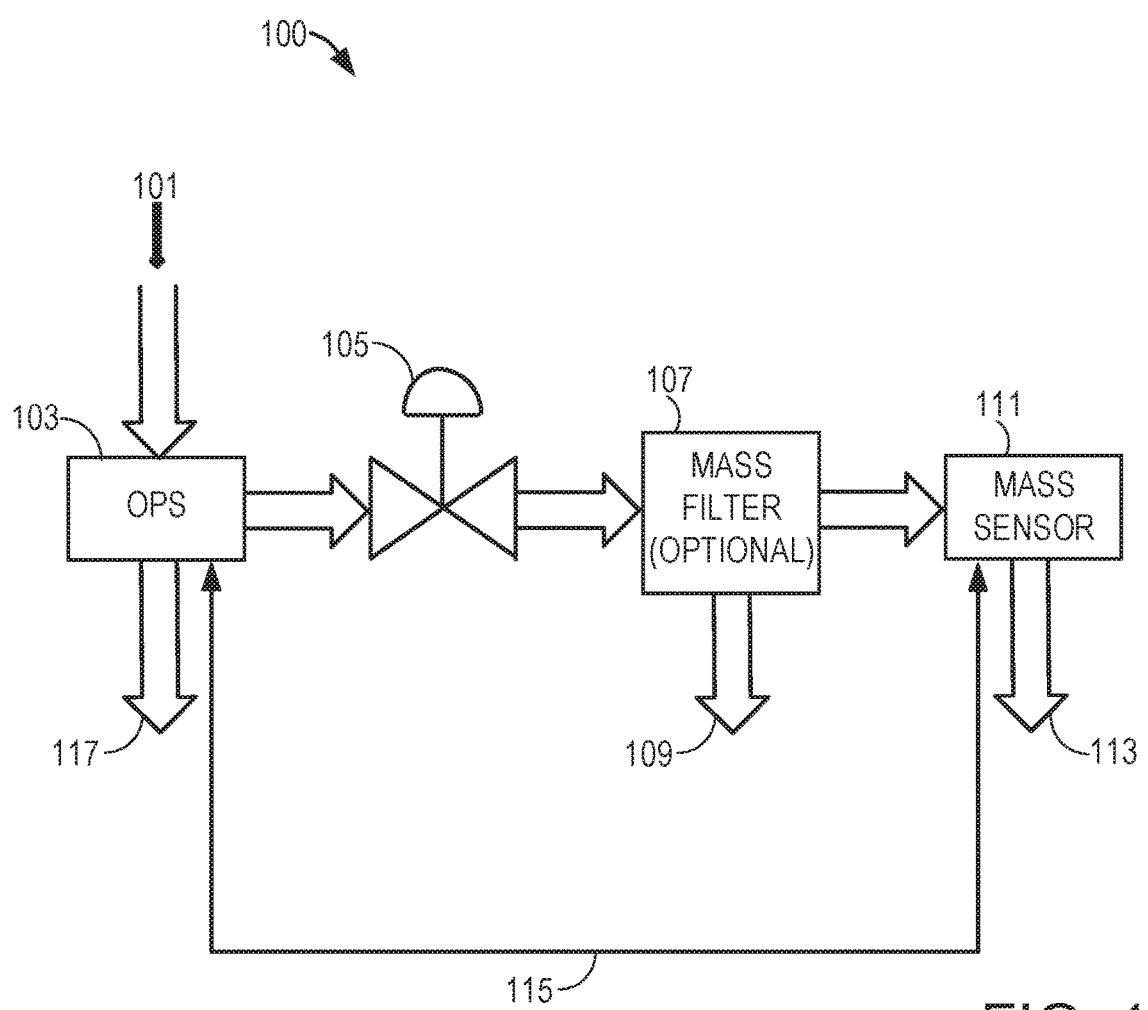
FIG. 1A shows a diagram of a particulate matter sensor calibration system in accordance with an embodiment of the disclosed subject matter.

As noted above, optical particle spectrometer (OPS) devices are frequently used to determine an approximation of the mass concentration of particulate matter (PM) in a given environment. The disclosed subject matter combines an OPS with a particle mass concentration measurement device, such as a film bulk acoustic resonator (FBAR) or a quartz crystal monitor (QCM, also known as a quartz crystal microbalance), in order to provide correction factors to the "equivalent-mass" concentration as determined by the OPS, thus calibrating the OPS for an effective mass concentration measurement of one or more of the reported particle size ranges. One characteristic of other devices, such as FBAR and QCM devices, is that they can be made very small and at low cost for use in applications where miniaturization and high-volume production are desired. However, unlike OPS devices, FBAR and QCM devices tend to load with particles over time, thereby resulting in inaccurate reporting values.

In embodiments, the calibration of the OPS (for one or more of the reported particle size ranges by the OPS) is performed with a single correction factor (e.g., a single point for a given PM value, such as $PM_{2.5}$). Typically, the correction factor is off by a constant multiple or factor, so that difference can be determined using the single correction factor. However, in other embodiments described herein, the calibration can be performed with multiple correction factors (e.g., at PM values of $PM_{2.5}$ and $PM_{10}$). Additional PM values (e.g., $PM_1$) may also be used to provide one or more correction factors. As is known in the art, the PM value is not a bin or size range of particles. Instead, the PM value relates to the entire mass of particles below a certain size (e.g., $PM_{2.5}$ relates to the entire mass of particles below 2.5 μm). Consequently, a more accurate and precise measurement of PM mass concentrations by the OPS is possible using the systems and methods provided herein.

Various types of OPS devices are available and usable with the various embodiments described herein. For example, a TSI Model 3330 Optical Particle Sizer or a TSI Model 8520 DUSTTRAK™ Aerosol Monitor (both available from TSI Incorporated, Shoreview, Minn., USA) uses light scattering technology to determine mass concentration in real-time. An aerosol sample is drawn into the sensing chamber in a continuous stream. One section of the aerosol stream is illuminated with a small beam of laser light. Particles in the aerosol stream scatter light in all directions. In some cases, a lens at, for example, about 90° to both the aerosol stream and laser beam, collects some of the scattered light and focuses it onto a photodetector. The detection circuitry converts the light into a voltage that is proportional to the amount of light scattered which is, in-turn, proportional to the mass concentration of the aerosol. The voltage is read by a processor and multiplied by an internal calibration constant to yield mass concentration. The internal calibration constant is determined from the ratio of the voltage response of the 3330 OPS or the DUSTTRAK™ monitor to the known mass concentration of a test aerosol (the monitor may be calibrated against a gravimetric reference using the respirable fraction of ISO Standard 12103-1, A1 test dust (e.g., such as "Arizona Road Dust")). If highly-accurate mass concentration readings are required, the 3330 OPS or the DUSTTRAK™ monitors can be recalibrated for an environment where a specific aerosol-type predominates. Similar types of calibration may also be accomplished with OPS-type devices available from other manufacturers.

Other types of particle measurement sensors are also available. For example, $PM_{2.5}$ particle sensors, such as the PMS 7003, are available from Plantower (Houshayu, Shunyi District, Beijing, China) and a number of other manufacturers.

Mass measuring devices and mass concentration measurement devices are known in, for example, the atmospheric aerosol sciences. Mass concentration devices can include, for example, the true-mass, filter-based TEOM® microbalance (available from Thermo Fisher Scientific; Franklin, Mass., USA). Other types of mass measurement concentration devices include, for example, a QCM or FBAR device, as noted above.

The QCM is used for micro weighing and consists of a quartz plate having a mechanical resonance frequency that is inversely proportional to the thickness of the plate. Because of the very high Q value (low internal friction) of quartz, the resonant frequency may be measured electrically through a piezoelectric effect. If a mass to be measured is applied to the resonator, e.g. in the form of PM, it will have an effect on frequency very nearly that of an increase in an equivalent mass of quartz. The added mass may be determined by translating frequency changes into an equivalent thickness of quartz and then into mass by means of the known density of quartz.

In one form, an FBAR device may be fabricated by, for example, sputter deposition of a piezoelectric material, such as zinc oxide (ZnO) or aluminum nitride (AlN), on to a thin membrane formed on a semiconductor substrate. The combination of the piezoelectric layer and thin membrane forms an acoustic structure that is resonant at a specific frequency. A ZnO film having a thickness of a few microns yields a resonator with a fundamental frequency of around 500 MHz. As particles adhere to a mass-sensitive element of the FBAR device, the fundamental frequency of the element decreases in proportion to the mass of particles that reach and adhere to the element. As particles are deposited onto the mass-sensitive element, the frequency at which the device oscillates decreases proportionally and an added amount of mass due the particles is calculated from the reduction in frequency.

As described in more detail below, the OPS is used as the continuous particle "mass" measuring component of the inventive subject matter, and the mass concentration measurement device (mass sensor) can be used either intermittently or continuously to measure true mass in the same environment, allowing the determination of a correction factor, $C_f$ to correct the OPS to a true mass measurement value. The combination of these two device types provides the benefits of, for example, (1) the robustness of the OPS measurement; with (2) the improved accuracy and precision enabled by the true mass measurement device, while concurrently overcoming shortcomings of the OPS such as, for example, (1) the potentially less accurate OPS measurement if the true mass is not known; and (2) the fact that true mass measuring components may not be suitable for continuous undiluted measurements because they load with particles over time, potentially losing sensitivity.

Therefore, the disclosed subject matter provides an intermittent or continuous, substantially real-time, in situ, true mass measurement to enable determination of an accurate correction factor for equivalent mass concentrations reported by an OPS. The inventive subject matter described herein will find use in many applications where increased mass concentration measurement accuracy is desired, and also where miniaturization and low cost of the instrumentation are required, such as automobile cabin air-quality sensing. It is well-known that the particle mass concentration calculated using an OPS can be in error by 20% or more, depending on differences between the material being sampled and that used to calibrate the OPS. This error is usually compensated for using a correction factor that is a multiplier constant or function that brings the OPS output more in line with the actual mass being measured. The actual mass is generally determined using a bulky and expensive reference device such as a tapered element oscillating microbalance (TEOM) noted above, which measures true particle mass concentration or a beta attenuation monitor (BAM), which is a US-based Federal equivalent mass concentration measuring method that determines mass based on the absorption of beta radiation by solid particles extracted from flowing air.

With reference now to FIG. 1A, a diagram of a particulate matter sensor calibration system 100, is shown in accordance with an embodiment of the disclosed subject matter. The particulate matter sensor calibration system 100 is shown to include an OPS 103, a particle diverter mechanism 105, an optional mass filter 107, and a mass sensor 111. A particle-laden airstream 101 is drawn into an inlet of the OPS 103 to begin the particle measurement and calibration process. Each of the OPS 103, mass filter 107, and mass sensor 111 devices are also shown to include respective outlet ports 117, 109, 113. Although not shown, each of the respective outlet ports 117, 109, 113 may be coupled to an absolute filter (not shown) on a downstream side of the respective ports.

A calibration communication loop 115 is coupled from the mass sensor 111 to the OPS 103 (e.g., through an electrical connection or a wireless connection) to provide actual mass concentration readings from the mass sensor 111 to a processor (not shown) within the OPS 103. In this embodiment, the processor with the OPS 103 calculates a calibration factor, $C_f$. In other embodiments, the OPS 103 provides the measured mass concentration value to the mass sensor 111. In this embodiment, the calibration factor, $C_f$, is calculated (e.g., by a processor within the mass sensor 111) at the mass sensor 111 and forwarded to the OPS 103. In either embodiment, the calibration communication loop 115 provides calibration data. Examples of using measurements from the mass sensor 111 to calibrate the OPS 103 are disclosed in more detail below.

The particle diverter mechanism 105 may be any type of fluidic switching-device to divert intermittently at least a portion (e.g., a controlled and predetermined fraction) of the particle-laden airstream 101 directly to the mass filter 107 or from the OPS 103 to the mass filter 107. In other embodiments, the particle-laden airstream may be coupled from the OPS 103 to the mass sensor 111 without using the intervening and optional mass filter 107. The particle diverter mechanism 105 can therefore comprise, for example, an electrically-activated solenoid valve or other types of fluidic valve that can be programmed or otherwise controlled to divert the airstream at predetermined time intervals. For example, the particle diverter mechanism 105 may divert the particle-laden airstream 101 to the mass filter 107 for one second each minute, one minute in each 60-minute monitoring interval, or other fraction of a predetermined monitoring time interval. In other embodiments, the particle diverter mechanism 105 comprises one or more pumps switched on and off at appropriate intervals. In still other embodiments, the particle diverter mechanism 105 comprises a valve coupled to a downstream pump to stop airflow to the mass filter 107 or mass sensor 111 combination at appropriate intervals. Overall, a determination as to how frequently to intermittently divert the airstream to the mass filter 107 can be dependent on factors such as, for example, a flow rate of the particle-laden airstream (or diverted fraction thereof), an aerosol concentration of the ambient environment being measured, a particle size-distribution, and a required accuracy of calibration of the OPS 103.

The mass filter 107 is intended to create size fractions of particles within the airstream. In various embodiments, the mass filter 107 may comprise a cascade impactor. In a cascade impactor, several particle collection impaction devices are placed serially in fluid communication with each other. The cascade impactor is based on accelerating a particle-laden airstream, at a known volumetric flowrate, through a series of increasingly-smaller nozzles, each nozzle being directed at an impaction plate. As the nozzle sizes decrease, the velocity of the particle-laden airstream increases, thereby increasing the inertia of particles. Particles with a given inertia can no longer follow the streamlines to successive stages and are impacted onto one of the series of impaction plates. For example, the particle-laden stream is directed into an inlet of the cascade impactor. Particles larger than approximately 10 micrometers ($D_p$>10 μm) are impacted onto an impaction plate in the first stage. Particles smaller than approximately 10 μm continue on to stage two of the impactor. Stage two can be designed such that particles less than 10 μm but greater than approximately 2.5 μm (2.5 μm<$D_p$<10 μm) are impacted from the particle stream. Subsequently, a third stage can be designed such that particles less than 2.5 μm but greater than approximately 1 μm (1 μm<$D_p$<2.5 μm) are impacted from the particle stream. In the example three stage impactor, particles less than approximately 1 μm exit the mass filter 107 through the outlet port 109 and, in some embodiments, into an absolute filter (not shown but known in the art). In other embodiments, additional stages can be added to the cascade impactor.

In this embodiment utilizing a cascade impactor, each of the impaction plates can be one of the various mass sensing devices as noted above (e.g., each plate comprises a separate FBAR or QCM device). The governing equations for an inertial impactor, known in the art, are used to calculate a given particle cut-size for each of the impaction plates (e.g., a measured particle mass concentration output after Stage I relates to a $PM_{10}$ size, a measured particle mass concentration output after Stage II relates to a $PM_{2.5}$ size, etc.). The actual mass concentration of particles, derived from the inertial impactor governing equations, can then be fed back to the OPS 103 and used to correlate the measured particle count to the mass concentrations, using a correction factor, $C_f$, for one or more particle size ranges (e.g., $PM_{2.5}$) correlated to the mass of all particles below a certain particle size. The correction factor applied to the OPS-measured particle concentration can be, for example, a ratio of particle concentration measured by the mass sensor 129 divided by a particle concentration measured by the OPS 103.

In other embodiments, the mass filter 107 can also be a virtual impactor or cyclonic-type separator. A virtual impactor is closely related to the inertial impactor, discussed above. However, a virtual impactor separates out particles that would be collected by an impaction plate (a small fraction of the total inlet flow, the minor flow), but that are instead simply redirected. Again, smaller particles more readily follow the streamlines of the particle-laden airstream as the particles pass out the sides (a larger fraction of the total inlet flow 101, the major flow) of a virtual impactor. Hence, like the inertial impactor, particle size ranges within both the major flow and the minor flow can be tailored to a given size range by tailoring geometrical and fluid flow parameters of the virtual impactor. Particle mass concentrations within either or both of the minor flow and the major flow can then be measured by a mass sensor 111. The actual measured mass may then be fed back through the communication loop 115 to the OPS 103. Other types of mass filters are described below.

In other embodiments, the mass filter 107 is a physically-rotating filter (e.g., a cylindrical filter), referred to as a centrifugal filter, where the rotating filter rotates along the axis parallel to the airstream. The rotational speed determines the particle cutoff size. Additionally, the collection efficiency of the centrifugal filter is adjustable by changing the rotational speed without changing the pressure drop across the rotating filter.

Figure 1B:
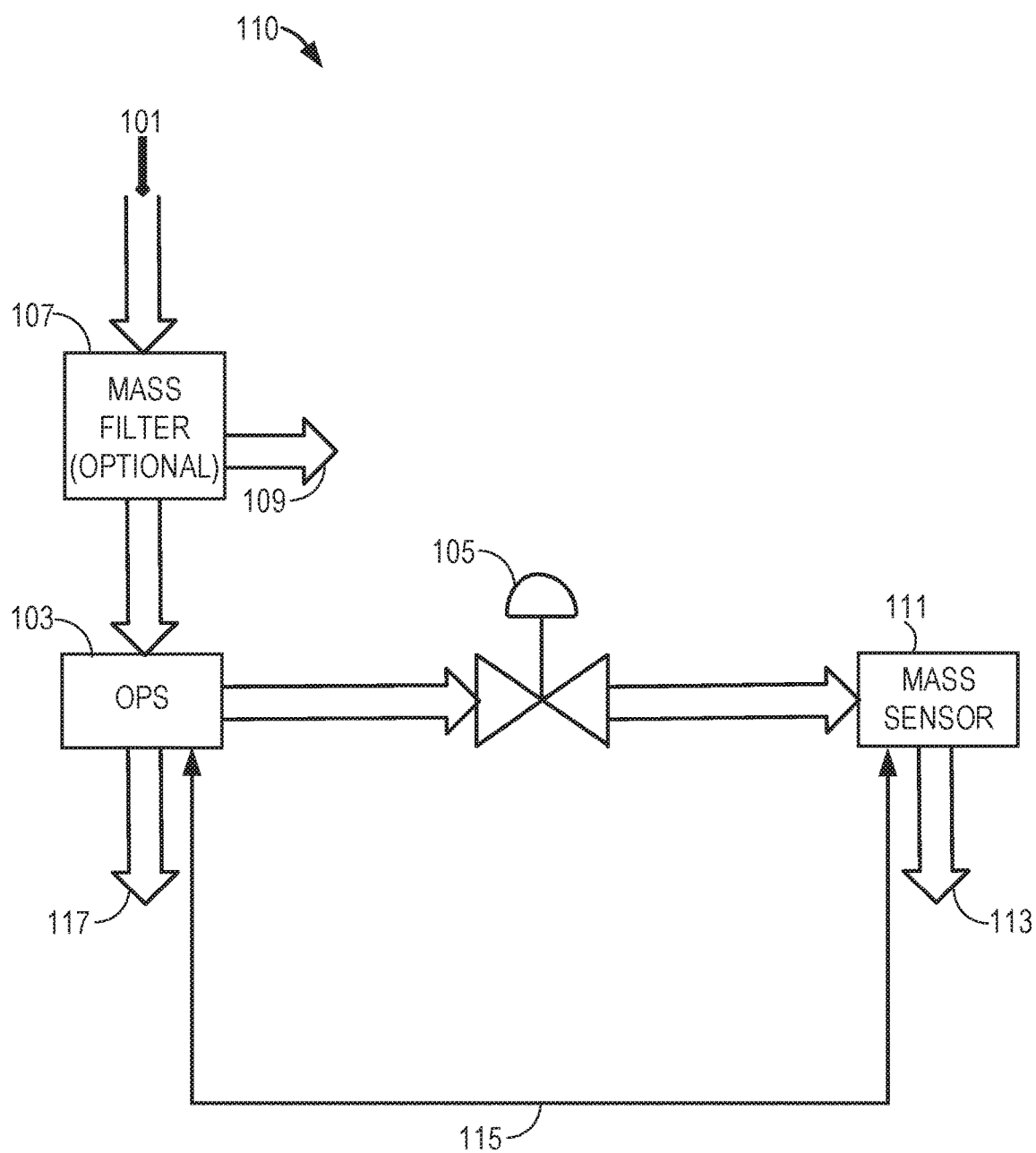
FIG. 1B shows a diagram of an alternative configuration of a particulate matter sensor calibration system in accordance with an embodiment of the disclosed subject matter

With reference now to FIG. 1B, a diagram of a particulate matter sensor calibration system 110 is shown in accordance with an embodiment of the disclosed subject matter. The particulate matter sensor calibration system 110 is shown to include an OPS 103, a particle diverter mechanism 105, an optional mass filter 107, and a mass sensor 111. A particle-laden airstream 101 is drawn into an inlet of the optional mass filter 107 to begin the particle measurement and calibration process. Each of the OPS 103, the mass filter 107, and the mass sensor 111 devices is also shown to include respective outlet ports 117, 109, 113. Although not shown, each of the respective outlet ports 117, 109, 113 may be coupled to an absolute filter (not shown) on a downstream side of the respective ports.

As compared with the particulate matter sensor calibration system 100 of FIG. 1A, the mass filter 107 of the particulate matter sensor calibration system 110 is configured so that the mass filter 107 is upstream of remaining components of the system 110. In the particulate matter sensor calibration system 100 of FIG. 1A, the OPS 103 was upstream of the mass sensor 107. In FIG. 1B, the mass filter 107 is shown to be upstream of the OPS 103. In various embodiments, the mass filter 107 may be the same as or similar to the mass filter 107.

Upon reading and understanding the disclosure provided herein, the person of ordinary skill in the art will understand when to use the optional mass filter 107, if at all. If used, the skilled artisan will further recognize which configuration (e.g., the mass filter 107 is upstream or downstream of the OPS 103) will provide a more particularly relevant sampling scheme for a given environment. For example, if the particulate matter sensor calibration system 100 or 110 will be used where both the OPS 103 and the mass sensor 111 will be used to perform, for example, a $PM_{2.5}$ measurement, configuring the mass filter 107 to be upstream of the OPS 103 may be preferable.

However, there are other situations in which it may be desirable for the OPS 103 to measure the entirety of the particle number concentration and the mass sensor 111 to measure only particle mass concentration below a selected particle size cutoff value. In still other situations, it may be desirable for both the OPS 103 and the mass sensor 111 to measure all particle sizes in a particular environment. In still other situations in which a natural size distribution of particles (e.g., particles already binned or sized (e.g., by a size-selective inlet), or a monodisperse or limited particle size range) may be present so the optional mass filter 107 may not be needed. At least each of these situations, as well as other situations, is contemplated by various embodiments presented herein.

Figure 1C:
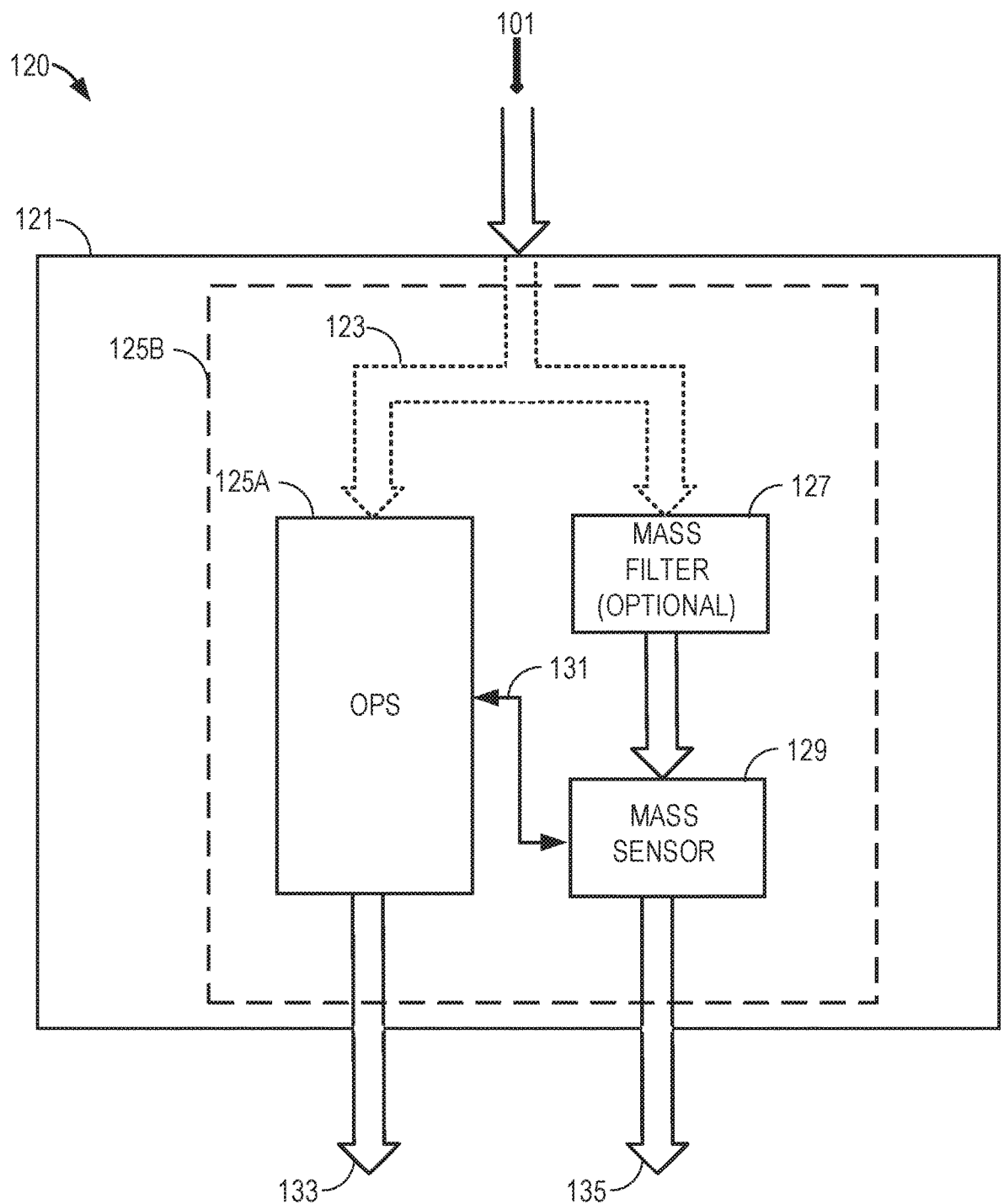
FIG. 1C shows a diagram of a particulate matter sensor calibration system in accordance with an alternative or supplemental embodiment of the disclosed subject matter.

Referring now to FIG. 1C, a diagram of a particulate matter sensor calibration system 120 in accordance with an alternative or supplemental embodiment of the disclosed subject matter is shown. The particulate matter sensor calibration system 120 is shown to include an integrated calibration system 121. However, the skilled artisan will recognize that the various components of the integrated calibration system 121 do not need to physically be proximate to one another in all embodiments as shown in FIG. 1C. The example of the system diagram 120 is provided merely to explain more readily the various relationships between the various components. Also, in other embodiments (not shown explicitly but readily understood by a person of ordinary skill in the art), the optional mass filter 127 may alternatively be located upstream of both the split-inlet port 123 (and consequently upstream of the OPS 125A) as described above with reference to FIG. 1B.

With continuing reference to FIG. 1C, the particulate matter sensor calibration system 120 is further shown to include a split-inlet port 123, an OPS 125A, a mass filter 127, a mass sensor 129, and a calibration communication loop 131. The OPS 125A and mass sensor 129 devices are also shown to include respective outlet ports 133, 135. Although not shown, each of the respective outlet ports 133, 135 may be coupled to an absolute filter (not shown) on a downstream side of the respective ports. As will be readily understandable to a person of ordinary skill in the art, upon reading and understanding the subject matter disclosed herein, one or more of the components or designs of the particulate matter sensor calibration system 120 of FIG. 1C may be used as an alternative to, or in conjunction with the particulate matter sensor calibration system 100 or 110 of FIG. 1A or FIG. 1B, respectively.

Additionally, the OPS 125A, the mass filter 127, and the mass sensor 129 may be the same as or similar to the OPS 103, the mass filter 107, and the mass sensor 111 of FIG. 1A. As discussed below, each of the components may take additional forms and, in various embodiments, may be combined into a single unit.

In one embodiment, the split-inlet port 123 may provide a substantially equal split of the particle-laden airstream 101 to both the OPS 125A and either the mass filter 127 or the mass sensor 129, substantially concurrently.

In other embodiments, the split-inlet port 123 may be a dichotomous sampling port where unequal amounts of the particle-laden airstream 101 may be directed to the OPS 125A and either the mass filter 127 or the mass sensor 129. In this embodiment, the portion of the split-inlet port 123 coupled to the mass filter 127 or the mass sensor 129 may be substantially smaller in cross-section, thereby carrying a smaller fraction of particulate matter from the airstream to the mass filter 127 or the mass sensor 129 than the fraction directed to the OPS 125A. In still other embodiments, a smaller fraction of the particulate matter is directed either to the mass filter 127 or the mass sensor 129 than to the OPS 125A by having a smaller fraction of total flow (e.g., from a pump, not shown) drawing the particle-laden airstream 101 through the two sides of the split-inlet port 123.

In either embodiment, the split-inlet port 123 is designed to be a substantially lossless inlet port. That is, the internal passages of the split-inlet port 123 are designed to eliminate or reduce particle losses due to inertial impaction (e.g., at the split point) or electrostatic adhesion to sidewalls of the split-inlet port 123.

In other embodiments, the split-inlet port 123 may be considered a virtual inlet port. In this embodiment, the flow path of the particle-laden airstream 101 is shared by an alternative embodiment of an OPS 125B, where the alternative embodiment of the OPS 125B includes at least one of the mass filter 127 and the mass sensor 129 within the OPS 125B. Specific exemplary embodiments of the virtual inlet port are described in more detail below but relate to, for example, using thermophoresis, electrophoresis, or electrostatic deposition. In these embodiments, a predetermined fraction of particulate matter of the particle-laden airstream 101 is driven towards the mass sensor 129.

Consequently, in one embodiment, the mass filter 127 is a thermophoretic device (e.g., employing a Peltier device or other thermoelectric heat pump) that may be heated or cooled to drive particles toward or away from the mass sensor 129. In a specific exemplary embodiment, for a given volumetric flowrate, a temperature of the thermophoretic device can be calculated to drive one or more predetermined particle size ranges toward the mass sensor 129.

In other embodiments, the mass filter 127 is an electrostatic-based device, which may operate on electrically-charged particles similar to or the same as a differential mobility analyzer (DMA, known in the art of aerosol physics). In this embodiment, the electrical mobility of a particle (dependent on the charge on the particle) is balanced with the mechanical mobility (inertia imparted onto the particle due to the volumetric airflow) of the particle to drive one or more predetermined particle-size ranges toward the mass sensor 129.

Figure 1D:
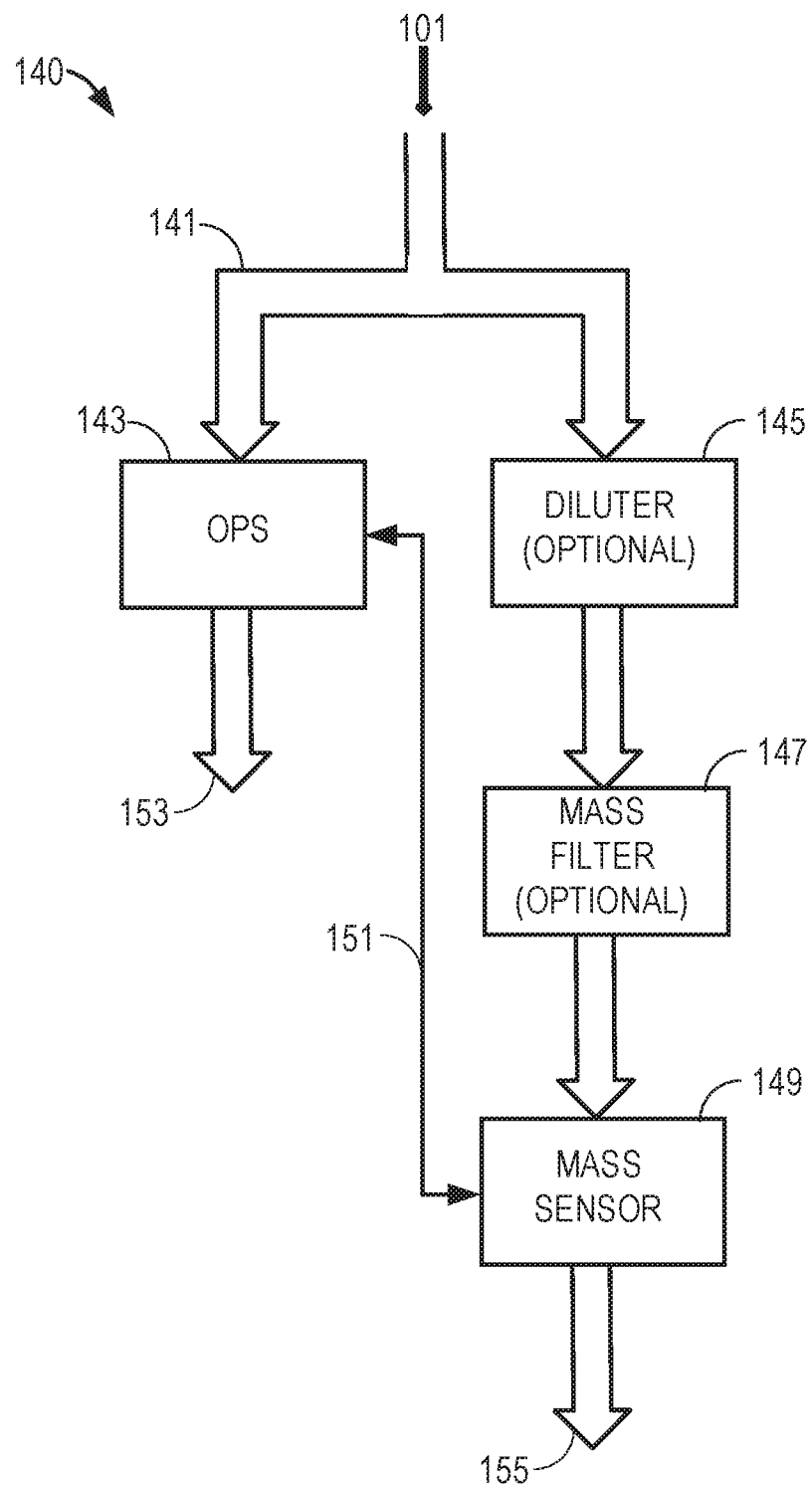
FIG. 1D shows a diagram of a particulate matter sensor calibration system in accordance with another alternative or supplemental embodiment of the disclosed subject matter.

Referring now to FIG. 1D, a system diagram of a particulate matter sensor calibration system 140 in accordance with an alternative or supplemental embodiment of the disclosed subject matter is shown. The particulate matter sensor calibration system 140 is shown to include a split-inlet port 141, an OPS 143, a diluter 145 (optional), a mass filter 147 (optional), a mass sensor 149, and a calibration communication loop 151. The OPS 143 and the mass sensor 149 devices are also shown to include respective outlet ports 153, 155. Although not shown, each of the respective outlet ports 153, 155 may be coupled to an absolute filter (not shown) on a downstream side of the respective ports. As will be readily understandable to a person of ordinary skill in the art, upon reading and understanding the subject matter disclosed herein, one or more of the components or designs of the particulate matter sensor calibration system 140 of FIG. 1D may be used as an alternative to, or in combination with the particulate matter sensor calibration systems 100, 110, or 120 of FIGS. 1A through 1C, respectively. For example, the mass filter 147 may alternatively be configured upstream of the split-inlet port 141 (and consequently the OPS 143) similar to the embodiment shown in FIG. 1B.

The OPS 143, the mass filter 147, the mass sensor 149, and the calibration communication loop 151 may be the same as or similar to the OPS, the mass filter, the mass sensor, and the calibration communication loop of any one of FIG. 1A through FIG. 1C. As discussed below, each of the components may take additional forms and, in various embodiments, may be combined into a single unit.

The diluter 145 may be a passive diluter device. A passive aerosol-diluter device reduces particle concentrations in high particle-concentration aerosols and provides a representative sample of the particle-laden airstream 101 that meets recommended operational requirements for various types of particle measurement and sizing instrumentation. In various embodiments, the diluter 145 comprises, for example, a filter in parallel with a flow-restricting device, such as an orifice, capillary, or valve. The flow-restricting device allows for the passage of aerosol particles, potentially with a mixing orifice providing clean, filtered air, to follow downstream of the flow-restricting device. Flow (e.g., determined either as a volumetric flowrate or a mass flowrate) through the particle-passing, flow-restricting device is monitored by, for example, a pressure and a temperature sensor, or other flow-sensing mechanism, such that the aerosol flow through the device can be measured. Combined with a measurement of the total flow through the device, the dilution ratio of the dilutor 145 can be constantly determined and updated. Running averages or other such smoothing algorithms may be applied to the dilution ratio data stream that results. Used in conjunction with an aerosol detection device, such as the mass sensor 149, the dilution ratio from the dilutor 145 can be used to correct the detected particle concentration and measure the true concentration at the inlet of the diluter 145. The determination of the true concentration of particles allows, among other things, the mass sensor to measure a higher concentration of aerosol, for instance, from the exhaust of an engine, than the system would be able to measure without dilution. Also, various dilution ratios (e.g., $10^5$ to 1, $10^3$ to 1, 10 to 1, etc.) may be predetermined as needed for a given particle concentration range for the measurement instrument (e.g., the mass sensor) or a known or calculated coincidence-error loss for an OPS.

In one embodiment, the split-inlet port 141 may provide a substantially equal split of the particle-laden airstream 101 to both the OPS 143 and the diluter 145, substantially concurrently. In other embodiments, the split-inlet port 141 may be a dichotomous sampling port where unequal amounts of the particle-laden airstream 101 may be directed to the OPS 143 and the diluter 145. Examples of a dichotomous sampling port are described above, with reference to FIG. 1C.

Figure 2:
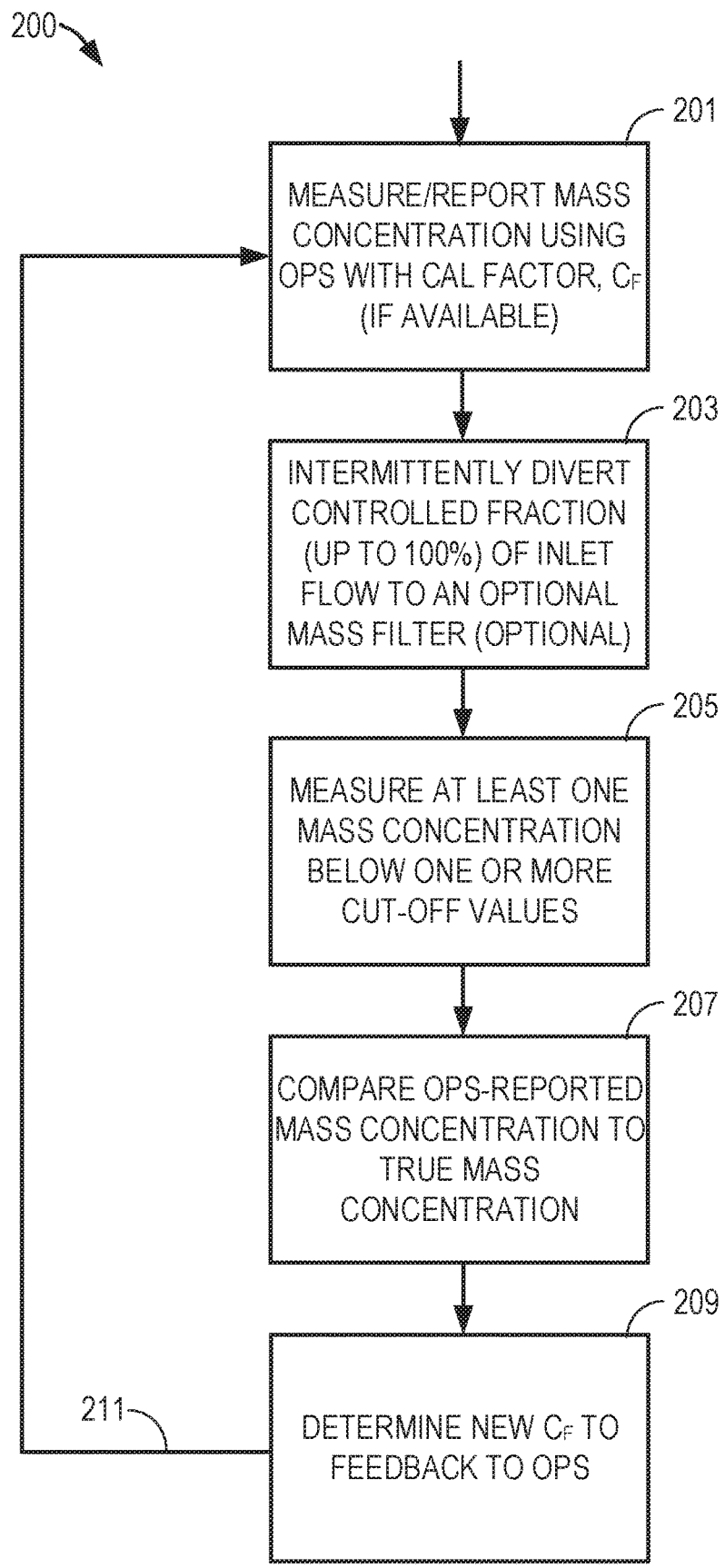
FIG. 2 shows an embodiment of an example calibration method usable with any of the systems of FIG. 1A through FIG. 1D.

FIG. 2 shows an embodiment of an example calibration method 200 usable with the systems of FIG. 1A through FIG. 1D. At operation 201, a mass concentration from the particle-laden airstream 101 is measured and reported (e.g., displayed or logged) by the OPS. If a calibration factor, $C_f$, is specified initially for the OPS, or if it has already been calculated from an actual received value of mass concentration, transmitted over the calibration communication loop, the reported mass concentration value already includes the calibration factor.

With concurrent reference to FIG. 1A, operation 203 is an optional step usable with the particulate matter sensor calibration system 100. At operation 203, a controlled fraction of the particle-laden airstream 101 is intermittently diverted to the optional mass filter 107 through the particle diverter mechanism 105. The particle-laden airstream 101 is diverted at predetermined time intervals. For example, the particle diverter mechanism 105 may divert the particle-laden airstream 101 to the mass filter 107 for one minute in each 60-minute monitoring interval. A ratio of total flow to diverted flow is used in a determination of the calibration factor.

At operation 205, at least one mass concentration number is measured at one or more cut-off values. For example, mass concentration number may be measured at a $PM_{10}$ cut-off value, a $PM_{2.5}$ cut-off value, and a $PM_1$ cut-off value. In other embodiments, a single mass concentration number is measured at a single cut-off value such as, for example, a $PM_{2.5}$ cut-off value.

At operation 207, each of the one or more measured mass concentration numbers is then sent to a processor in the OPS to compare the OPS-measured mass concentration number with the true mass concentration number as determined by the mass sensor. In other embodiments, the OPS sends a measured mass concentration number to the mass sensor and the mass sensor sends the calibration factor, $C_f$, to the OPS via the calibration communication loop.

At operation 209, a new calibration factor, $C_f$, is calculated based on the most recent comparison of the measured mass concentration numbers of the OPS and the mass sensor. If needed, a new calibration factor is then fed back to the OPS. The example calibration method 200 then returns 211 to operation 201.

Included in the disclosed subject matter provided herein are various system and method diagrams describing various embodiments of the particulate matter sensor calibration system. Therefore, the description above includes illustrative examples, devices, systems, and methods that embody the disclosed subject matter. In the description, for purposes of explanation, numerous specific details were set forth in order to provide an understanding of various embodiments of the inventive subject matter. It will be evident, however, to those of ordinary skill in the art that various embodiments of the inventive subject matter may be practiced without these specific details. Further, well-known structures, materials, and techniques have not been shown in detail, so as not to obscure the various illustrated embodiments.

As used herein, the term "or" may be construed in an inclusive or exclusive sense. Additionally, although various exemplary embodiments discussed herein focus on particular ways to produce and calibrate a particulate matter sensor calibration system, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various combinations.

Although various embodiments are discussed separately, these separate embodiments are not intended to be considered as independent techniques or designs. As indicated above, each of the various portions may be inter-related and each may be used separately or in combination with other particulate matter sensor calibration system embodiments discussed herein.

Consequently, many modifications and variations can be made, as will be apparent to the person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A system to measure a sampled particle-laden airstream, the system comprising:
    an optical particle spectrometer to measure a concentration of particulate matter in the sampled particle-laden airstream;
    a particle diverter in fluid communication with the optical particle spectrometer, the particle diverter to divert at least a portion of the particle-laden airstream at predetermined intervals;
    a mass sensor to measure an actual mass of a fraction of particles within the diverted particle-laden airstream received at an inlet of the mass sensor from the particle diverter; and
    a calibration communication loop to provide substantially real-time calibration data corresponding to the actual measured mass of the particles to the optical particle spectrometer, the optical particle spectrometer thereby being configured to report an equivalent mass concentration based on the true mass measurement in situ and in substantially real time.

2. The system of claim 1, further comprising a mass filter coupled upstream of the mass sensor to receive the portion of the particle-laden airstream and to filter a fraction of the particles within the particle-laden airstream that are above a predetermined particle size.

3. The system of claim 2, further comprising a particle diluter upstream of and in fluid communication with at least one of the mass filter and the mass sensor to dilute a concentration of the particle-laden airstream.

4. The system of claim 1, further comprising a mass filter coupled upstream of the optical particle spectrometer to receive the sampled particle-laden airstream and to filter a fraction of the particles within the particle-laden airstream that are above a predetermined particle size.

5. The system of claim 1, wherein the mass sensor is a mass concentration measurement device to provide a correction factor to the optical particle spectrometer through the calibration communication loop to calibrate the optical particle spectrometer to report an equivalent-mass concentration measurement.

6. The system of claim 5, wherein the calibration of the optical particle spectrometer is performed with a single correction factor.

7. The system of claim 6, wherein the single correction factor is chosen for a predetermined particulate matter size range.

8. The system of claim 5, wherein the calibration of the optical particle spectrometer is performed with multiple correction factors.

9. The system of claim 8, wherein each of the multiple correction factors are chosen for different predetermined particulate matter size ranges.

10. The system of claim 5, wherein the calibration of the optical particle spectrometer is performed using a specific type of aerosol for a particular sampled-environment.

11. The system of claim 1, wherein the particle diverter is a fluidic switching device to divert intermittently at least a portion of the particle-laden airstream to the mass sensor.

12. The system of claim 1, wherein the mass sensor is a film bulk acoustic resonator.

13. The system of claim 1, wherein the mass sensor is a quartz crystal monitor.

14. A system to measure a sampled particle-laden airstream, the system comprising:
    an optical particle spectrometer to receive a fractional portion of the sampled particle- laden airstream and to measure a concentration of particulate matter in the fractional portion of the sampled particle-laden airstream;
    a mass filter to receive a remaining fractional portion of the sampled particle-laden airstream, the mass filter to filter a fraction of the particles within the remaining fractional portion of the sampled particle-laden airstream that are above a predetermined particle size;
    a mass sensor coupled downstream of the mass filter to measure an actual mass of the fraction of the particles received from the mass filter; and
    a calibration communication loop between the optical particle spectrometer and the mass sensor to provide substantially real-time calibration data corresponding to the actual measured mass from the mass sensor to the optical particle spectrometer to calibrate the optical particle spectrometer for an equivalent-mass concentration measurement, the optical particle spectrometer thereby being configured to report an equivalent mass concentration based on the true mass measurement in situ and in substantially real time.

15. The system of claim 14, further comprising a split-inlet port coupled upstream of both the optical particle spectrometer and the mass sensor.

16. The system of claim 15, wherein the split-inlet port is a dichotomous sampling port configured to provide a smaller fraction of particulate matter to the mass sensor than to the optical particle spectrometer.

17. The system of claim 15, wherein the split-inlet port is configured to provide substantially equal portions of the sampled particle-laden airstream to the optical particle spectrometer and the mass sensor substantially concurrently.

18. The system of claim 15, wherein the mass sensor is selectable to sample a true mass of the particle-lade airstream in at least one of two modes from modes comprising an intermittent sampling mode and a continuous sampling mode.

19. A method of calibrating an optical particle spectrometer for an equivalent-mass concentration measurement, the method comprising:
sampling a particle-laden airstream;
diverting a controlled fraction of the particle-laden airstream to an inlet of a mass sensor at predetermined intervals;
measuring at least one actual mass concentration of particulate matter in the particle-laden airstream below at least one particle size cutoff value; and
communicating the at least one actual measured mass concentration of particulate matter thereby providing substantially real-time calibration data corresponding to the actual measured mass of the particles to the optical particle spectrometer to provide a calibration factor to the optical particle spectrometer in situ and in substantially real time.

20. The method of claim 19, further comprising reporting an equivalent-mass concentration measurement from the calibrated optical particle spectrometer.

* * * * *

UNITED STATES PATENT AND TRADEMARK OFFICE
CERTIFICATE OF CORRECTION

| | |
|---|---|
| PATENT NO. | : 11,604,131 B2 |
| APPLICATION NO. | : 16/605899 |
| DATED | : March 14, 2023 |
| INVENTOR(S) | : Farmer et al. |

It is certified that error appears in the above-identified patent and that said Letters Patent is hereby corrected as shown below:

On the Title Page

On page 2, in Column 2, under Item (56) "Other Publications", Line 20, after "16 pgs.", insert --"Korean Application Serial No. 10-2019-7033562, Notice of Preliminary Rejection dated Aug. 24, 2022", w/English Translation, 13 pgs.
"European Application Serial No. 18787066.2, Communication Pursuant to Article 94(3) EPC dated Aug. 31, 2022", 8 pgs.--

In the Specification

In Column 1, Line 11, delete "tiled" and insert --filed-- therefor

In Column 6, Line 32, delete "flow 101," and insert --flow,-- therefor

In Column 7, Line 3, delete "107." and insert --111.-- therefor

In Column 9, Line 28, delete "dilutor" and insert --diluter-- therefor

In Column 9, Line 40, delete "dilutor" and insert --diluter-- therefor

In Column 9, Line 45, delete "dilutor" and insert --diluter-- therefor

In the Claims

In Column 12, Line 33, in Claim 14, delete "particle- laden" and insert --particle-laden-- therefor In Column 12, Line 67, in Claim 18, delete "particle-lade" and insert --particle-laden-- therefor Signed and Sealed this
Thirtieth Day of July, 2024

Katherine Kelly Vidal
*Director of the United States Patent and Trademark Office*